C. S. COLEMAN.
BOILER TUBE AND END PLATE CONNECTION.
APPLICATION FILED JAN. 15, 1918.
1,397,080.
Patented Nov. 15, 1921.
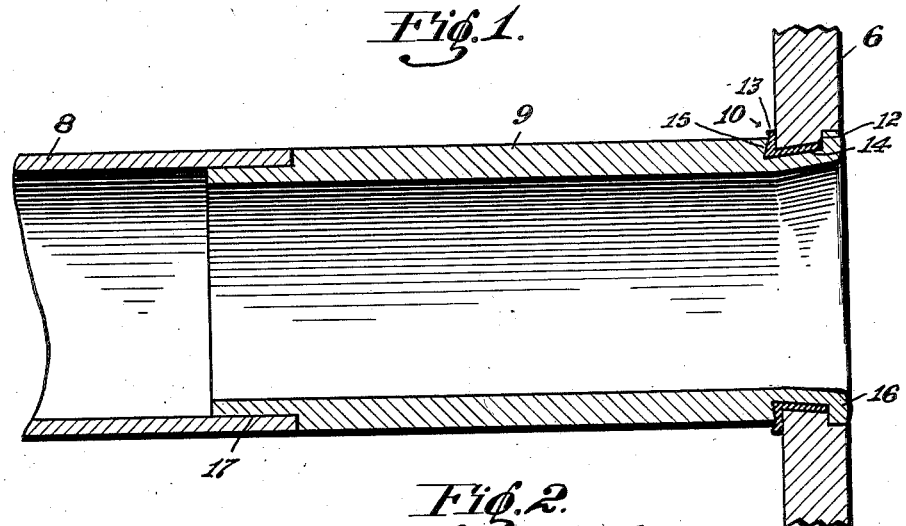
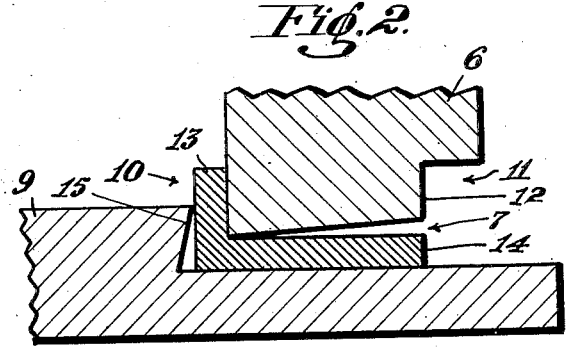
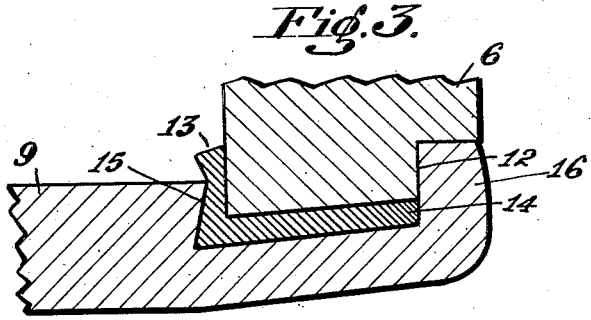
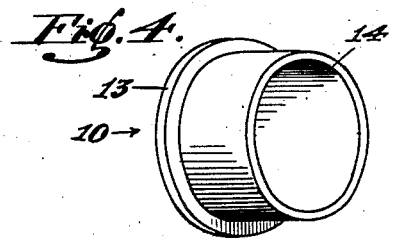
INVENTOR.
Charles S. Coleman;
BY
R. S. Berry
Attorney

UNITED STATES PATENT OFFICE.

CHARLES S. COLEMAN, OF LOS ANGELES, CALIFORNIA.

BOILER-TUBE AND END-PLATE CONNECTION.

1,397,080.   Specification of Letters Patent.   Patented Nov. 15, 1921.

Application filed January 15, 1918. Serial No. 211,930.

*To all whom it may concern:*

Be it known that I, CHARLES S. COLEMAN, a citizen of the United States, residing at Los Angeles, in the county of Los Angeles and State of California, have invented a new and useful Boiler-Tube and End-Plate Connection, of which the following is a specification.

This invention relates to a boiler tube and end plate connection.

It is the object of this invention to provide a connection for the tubes and end plates of boilers of the fire tube type in which the joint between the tube and plate is so formed as to withstand the strains imposed thereon by expansion, contraction and vibration of the tubes and plate in relation to each other, and so constructed as to be protected against injury by the intense heat in the fire box impinging on the tube ends, thereby reducing the likelihood of leakage of the joint to a minimum.

Another object is to provide a tube end and connection construction which is admirably suited for use in repairing old tubes and boilers.

A further object is to provide a tube and end plate connection in which the tube is flared outwardly against a soft metal gasket in passing through the plate and has its end beaded in a recess in the outer face of the plate so as not to expose the edges of the bead to the destructive action of flames in the fire box, and also conceal and protect the gasket on the fire side of the plate.

Other objects will appear hereinafter.

The invention is illustrated in the accompanying drawings, in which:

Figure 1 is a view in vertical section and elevation showing the tube as connected to the boiler end plate.

Fig. 2 is a detail showing the manner of forming the end plate and assembling the tube therein before beading the latter.

Fig. 3 is an enlarged sectional view more clearly showing the manner of forming the joint.

Fig. 4 is a perspective view of the gasket.

More specifically 6 indicates an end plate formed with a circular tube receiving opening 7; 8 designates the usual fire tube; 9 my improved tube end, and 10 the gasket for lining the opening 7.

In carrying out the invention, the opening 7 is formed with a tapered wall which diverges outwardly from the inner face of the plate and the outer margin of the opening is formed with a channel 11 to provide a countersunk annular shoulder 12. The gasket 10 is cylindrical and formed with a flange 13 on one end which is adapted to seat on the inner face of the plate on the inner margin of the opening 7 when the gasket is inserted in the latter. The cylindrical body 14 of the gasket is of an outside diameter substantially corresponding to the diameter of the inner reduced end of the opening 7 and is of such length that when the gasket is in position its outer end will lie flush with the shoulder 12. This gasket is preferably formed of copper but may be made of any suitable metal or alloys having similar qualities of ductility, malleability and non-corrosiveness.

The tube-end 9 is formed with an outside diameter corresponding to that of the tube and has a wall thickness about double that of the tube; the end portions of the tube-end being formed with a reduced outer diameter substantially corresponding to the inside diameter of the tube. A shoulder 15 is formed at the base of the reduced outer end of the tube-end, the annular face of which inclines inwardly so that its outer edge will be in advance of its inner edge to form an annular projection for engaging the flange 13 of the gasket.

The inner reduced end of the tube-end is affixed by a weld joint 17 to the end of the tube and is thus integral with the latter.

In forming the joint between the tube-end and the end plate, the gasket is put in place on the inside of the latter and the outer reduced end of the tube-end is passed through the gasket with the shoulder abutting against the flange 13.

On driving the tube the projecting shoulder may be forced into the gasket, as shown in Fig. 1, to effect a close contact between the shoulder and gasket, and also force the gasket flange tight against the back face of the end plate, thus effecting a tighter joint than would be attained by employing an un-beveled shoulder.

After the tube-end has been driven in place, its reduced outer end is swaged to conform to the tapered wall of the opening 7, the gasket being pressed against the tapered wall to pack the joint. The outer end of the tube end is then beaded over in the channel 11; the bead seating on the shoulder 12 and having its outer face substantially flush with that of the end plate. By this construction the end of the gasket is concealed intermediate the faces of the end plate and the edge of the bead is protected in the counterbore against the action of flames.

By forming the tube-end of greater wall thickness than that of the tube, greater rigidity and strength is attained at the point of juncture of the tube and end plate and throughout the length of the tube-end which tends to lessen vibration on the joint, and by forming the joint as described the connection will hold up without leakage for a considerable time longer than can be accomplished by the ordinary joint, as has been determined by me by tests extending over a long period of time.

I claim:

1. In a boiler tube and end plate connection, a boiler end plate formed with a circular opening having a counterbore on its outer marginal edge forming a counter-sunk shoulder, an annular gasket extending around the portion of the wall of the opening between the shoulder and the inner face of the end plate with its inner end terminating at the shoulder and positioned intermediate the faces of the end plate, and a tube end section projecting through said gasket from the inner face of said boiler end plate and having its outer end beaded over the end of the gasket onto the shoulder and filling said counterbore whereby the outer end of the gasket is covered by the bead at a point between the inner and outer faces of the boiler end plate.

2. In a boiler tube and end plate connection, a boiler end plate formed with a circular opening having a counter bore on its outer marginal edge forming a counter sunk shoulder, an annular gasket extending over the wall of the opening between the counter sunk shoulder and the inner marginal edge of the opening, said gasket having a flange extending onto the inner face of the boiler end plate, and a tube end section having a reduced end portion forming a shoulder, said reduced end portion projecting through said gasket from the inner face of said boiler end plate and having its outer end beaded over the end of said gasket and projecting beyond the gasket into the counter bore and filling the latter whereby a broken joint is formed and the outer portion of the gasket concealed intermediate the inner and outer faces of the boiler end plate.

3. In a boiler tube and end plate connection, a boiler end plate formed with a circular opening, a gasket having a cylindrical portion of a length less than the thickness of the end plate and formed with an end flange, said gasket arranged with its cylindrical portion extending into the opening in the end plate and with its flange abutting against the inner face of the end plate, said end plate being formed with a recess around the outer marginal edge of the opening forming a shoulder intermediate the inner and outer faces of the end plate flush with the end of the gasket, and a tube end section having a reduced end portion forming a shoulder; the reduced portion of said tube end section extending through the gasket with its shoulder abutting against the flange of the gasket and the outer end of the tube end section being turned into the recess to cover the end of the gasket in close contact therewith and to seat on the recessed shoulder with the turned portion of the end section terminating against the side wall of the recess and filling the latter to form a broken joint.

4. In a flue and end plate connection, a boiler end plate having an opening with a reduced portion and an enlarged portion forming an annular shoulder in the wall of the opening intermediate the inner and outer faces of the sheet, a gasket covering the wall of the reduced portion of the opening terminating at the shoulder, and a flue end extending through the gasket having its end turned over the end of the gasket and snugly seating on the shoulder and the side wall of the enlarged portion of the opening forming a broken joint between the end of the gasket and the outer face of the end plate.

CHARLES S. COLEMAN.